United States Patent
Norwood, Sr.

(10) Patent No.: US 9,833,951 B1
(45) Date of Patent: Dec. 5, 2017

(54) SYSTEM AND METHOD FOR CONTROL OF PLASTIC FILAMENT EXTRUDER

(71) Applicant: Vandell Norwood, Sr., San Antonio, TX (US)

(72) Inventor: Vandell Norwood, Sr., San Antonio, TX (US)

( * ) Notice: Subject to any disclaimer, the term of this patent is extended or adjusted under 35 U.S.C. 154(b) by 316 days.

(21) Appl. No.: 14/805,764

(22) Filed: Jul. 22, 2015

(51) Int. Cl.
| | |
|---|---|
| *B29C 47/92* | (2006.01) |
| *B29C 67/00* | (2017.01) |
| *B29C 47/00* | (2006.01) |
| *B01F 15/00* | (2006.01) |
| *B33Y 10/00* | (2015.01) |
| *B33Y 30/00* | (2015.01) |
| *B33Y 50/02* | (2015.01) |

(52) U.S. Cl.
CPC .... *B29C 67/0088* (2013.01); *B01F 15/00175* (2013.01); *B01F 15/00201* (2013.01); *B29C 47/0014* (2013.01); *B29C 67/0055* (2013.01); *B29C 2947/92047* (2013.01); *B29C 2947/92209* (2013.01); *B29C 2947/92542* (2013.01); *B29C 2947/92704* (2013.01); *B33Y 10/00* (2014.12); *B33Y 30/00* (2014.12); *B33Y 50/02* (2014.12)

(58) Field of Classification Search
CPC ......... B01F 15/00175; B01F 15/00201; B29B 11/10; B29C 47/0014; B29C 47/92; B29C 2947/92047; B29C 2947/92209; B29C 2947/92542; B29C 2947/92704
USPC ...... 264/40.1, 40.6; 425/135, 136, 143, 144, 425/162; 366/76.2, 76.9, 132, 145, 146
See application file for complete search history.

(56) References Cited

U.S. PATENT DOCUMENTS

| | | | | |
|---|---|---|---|---|
| 3,070,836 A | * | 1/1963 | De Haven | B29C 47/92 425/143 X |
| 3,841,147 A | * | 10/1974 | Coil | B29C 47/92 702/50 |
| 4,309,114 A | * | 1/1982 | Klein | B29C 47/92 264/40.6 X |
| 4,550,002 A | * | 10/1985 | Uhland | B29C 47/92 264/40.1 |
| 4,931,229 A | * | 6/1990 | Krimmel | B29C 47/92 149/109.6 |
| 5,179,521 A | * | 1/1993 | Edge | B29B 7/72 366/132 X |
| 2009/0191295 A1 | * | 7/2009 | Onishi | B29C 47/92 425/162 |

* cited by examiner

*Primary Examiner* — Leo B Tentoni
(74) *Attorney, Agent, or Firm* — Wayne J. Colton, Inc.

(57) ABSTRACT

A method for control of a plastic filament extruder includes the steps of providing a plastic filament extruder; introducing a quantity of plastic chips to the extruder; activating a heater to heat a mold body of the extruder to a target temperature; activating an electric motor in response to the mold body reaching the target temperature, thereby causing an auger to drive plastic chips the mold body and out of an extrudate sizing die; monitoring the electric current draw of the electric motor; and upwardly adjusting the target temperature of the mold body in response to a threshold increase in the electric current draw of the electric motor. Steps may also include maintaining the mold body within a temperature range about the target temperature and of deactivating the electric motor in response to the target temperature exceeding a threshold deviation above the temperature of the mold body.

8 Claims, 11 Drawing Sheets

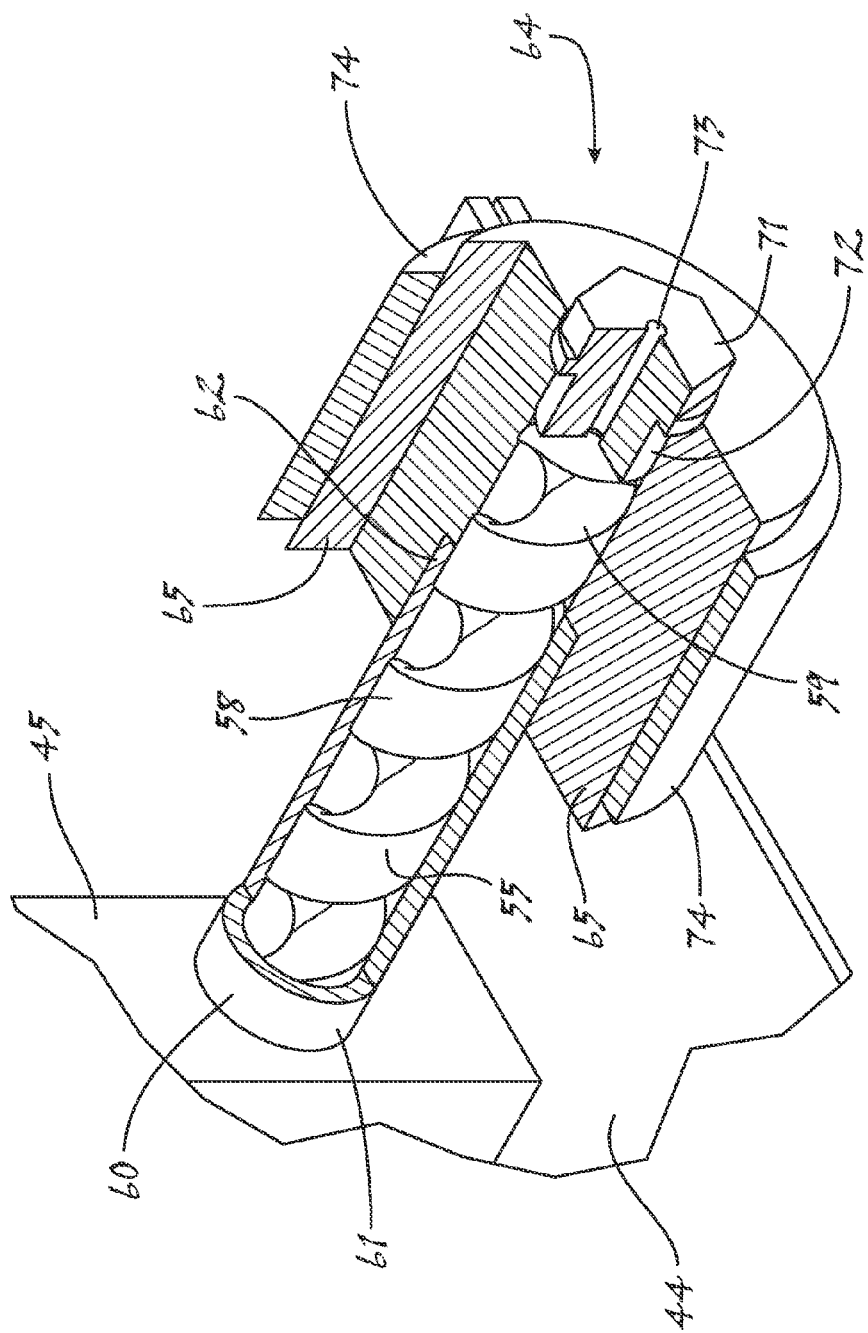

SYSTEM AND METHOD FOR CONTROL OF PLASTIC FILAMENT EXTRUDER

FIELD OF THE INVENTION

The present invention relates to home, or hobby, manufacturing. More particularly, the invention relates to a system and method for controlling the molding temperature of a plastic filament extruder of the type used by hobbyist to produce plastic filament for use in additive manufacturing processes, known also as "3-D printing."

BACKGROUND OF THE INVENTION

The art of additive manufacturing, also known as "3-D printing." has in recent times advanced dramatically such that 3-D printers are now widely available for use by hobbyist manufacturers. As the availability of such machines has increased, however, so too has the desire of the home manufacturer to produce his or her own plastic filament for use in the machine. To do so, the home user will typically obtain plastic material from any available source, such as, for example, recycled plastic products. The obtained plastic material is then chopped, ground, sliced or otherwise formed into small plastic chips, whereafter the plastic chips are fed into a heated extrusion mold adapted to form the plastic into plastic filament sized for use in the additive manufacturing device.

Unfortunately, this simple sounding process is fraught with difficulty owing in large part to the lack of manufacturing control generally implemented in the hobbyist environment. Of particular issue is the fact that the raw plastic material obtained by the hobbyist will often comprise a mixture of plastics and, in many cases, will be of a composition that is not fully known to the hobbyist. As a result, it is extraordinarily difficult for the hobbyist to establish and maintain the proper mold temperature for producing plastic filament of quality acceptable for use in the 3-D printer. To be sure, the only method available to the hobbyist beyond initial assessment of the raw plastic material for setting a likely melting temperature is for the hobbyist to examine the extrudate emanating from the mold and then making temperature adjustments based on perceived quality.

While to foregoing method is the state of the art, Applicant has found it less than satisfactory. In particular, it is noted that the foregoing method only allows adjustment to be made after the source plastic material has fully traversed the mold, resulting in wasted time and to material. Additionally, and especially to the extent that it is to be expected that the hobbyist obtained raw plastic material will be an inconsistent mixture of plastic types and sizes, the foregoing method required painstaking attention, and often difficult to achieve skill, to continuously monitor the extrudate and make necessary temperature adjustments.

Given these serious shortcomings of the prior art, it is an overriding object of the present invention to improve generally over the prior art by providing a system and method for control of a plastic filament extruder that includes an intrinsic means for indicating to the user that a temperature adjustment is necessary.

Additionally, it is an object of the present invention to provide such a system and method for control of a plastic filament extruder that may also be implemented in an autonomous or semi-autonomous mode.

Still further, it is an object of the present invention to provide such a system and method for control of a plastic filament extruder that is readily adaptable to, or capable of integration with, otherwise conventionally available home extruders.

Finally, it is an object of the present invention to provide such a system and method for control of a plastic filament extruder that is relatively simple and inexpensive to implement, thereby ensuring that the improvements of the present invention are widely available to hobbyist manufacturers.

SUMMARY OF THE INVENTION

In accordance with the foregoing objects, the present invention—a method for control of a plastic filament extruder—generally comprises the steps of providing a plastic filament extruder comprising:
  an auger body having an internal chamber for collecting a quantity of plastic chips and a hopper adapted to feed collected plastic chips into the internal chamber of the auger body;
  a mold having a body defining an internal chamber, a heater adapted to heat the body and its internal chamber, and an extrudate shaping die positioned in an outlet from the internal chamber;
  a conduit extending from an outlet from the internal chamber of the auger body to an inlet to the internal chamber of mold body;
  an auger extending from the internal chamber of the auger body, through the conduit and into the internal chamber of the mold body; and
  an electric motor operatively adapted to drive rotation of the auger,
and thereafter introducing a quantity of plastic chips into the internal chamber of the auger body; activating the heater to heat the mold body to a target temperature; activating the electric motor in response to the mold body reaching the target temperature, thereby causing the auger to drive plastic chips from the internal chamber of the auger body into the internal chamber of the mold body and, as the plastic chips are melted within the internal chamber of the mold body, through the die; monitoring the electric current draw of the electric motor; and upwardly adjusting the target temperature of the mold body in response to a threshold increase in the electric current draw of the electric motor.

The method for control of a plastic filament extruder also most preferably comprises the further steps of maintaining the body of the mold within a temperature range about the target temperature and of deactivating the electric motor in response to the target temperature exceeding a threshold deviation above the temperature of the mold body. In at least some preferred implementations of the present invention, the step of upwardly adjusting the target temperature of the mold body is conducted autonomously without user intervention beyond initially establishing operating parameters for the system for control of a plastic filament extruder in which the method is conducted.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIG. 6 shows, in a partially cut-away detail view of the foremost positioned components of FIG. 2, various details of the conduit, auger and mold of the plastic filament extruder of FIG. 2; and FIGS. 7 through 11 show, in flowcharts, a preferred implementation of the method of operation in use of the control system for use in connection with a plastic filament extruder of the present invention, wherein:

FIG. 7 shows details of the implemented setup routine;

FIG. 8 shows details of the implemented monitor auger routine;

FIG. 9 shows details of the implemented establish temperature routine;

FIG. 10, show details of the implemented monitor temperature routine; and FIG. 11 shows details of the implemented adjust target temperature subroutine.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
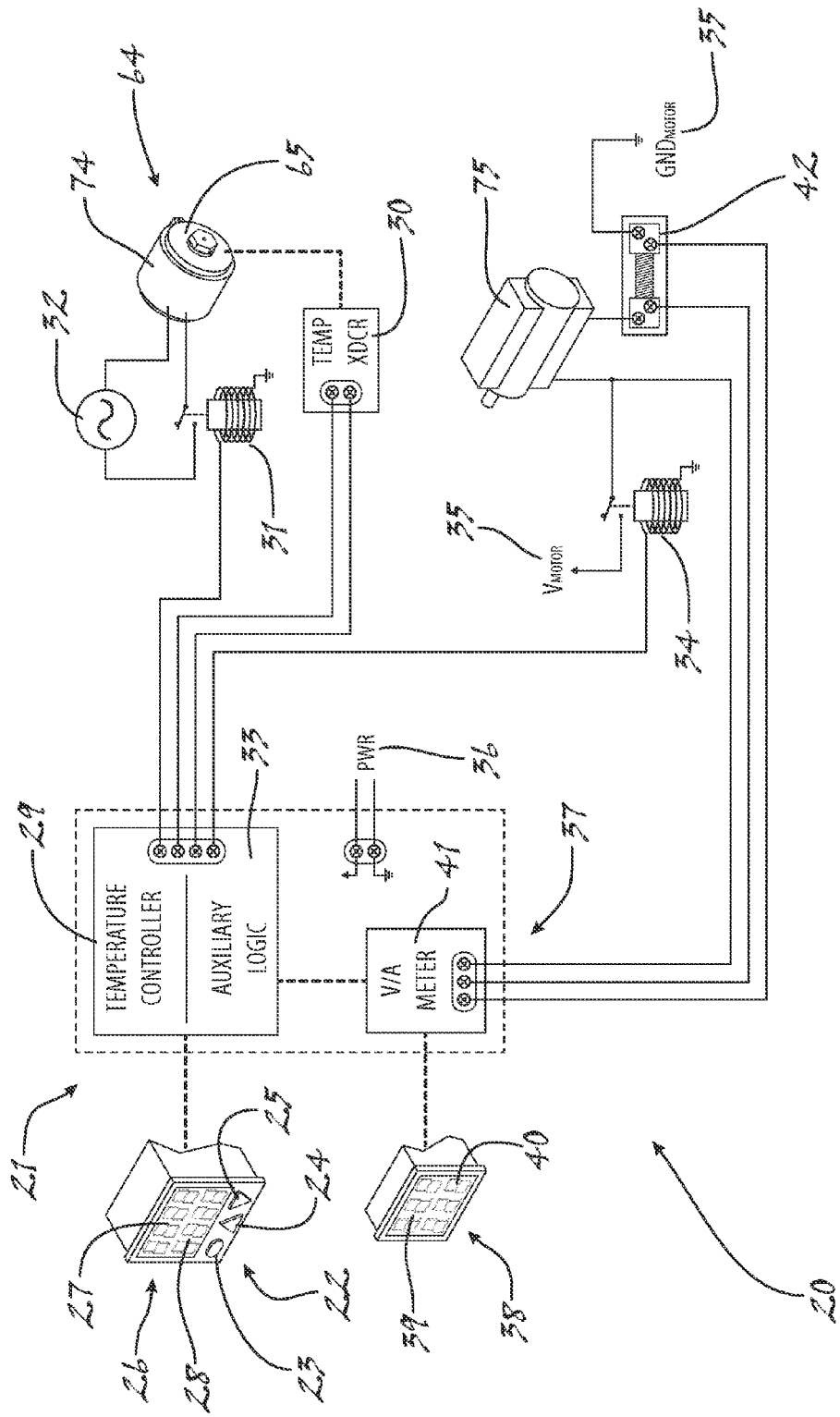
FIG. 1 shows, in a schematic block diagram, a preferred implementation of the control system for use in connection with a plastic filament extruder of the present invention.
Figure 2:
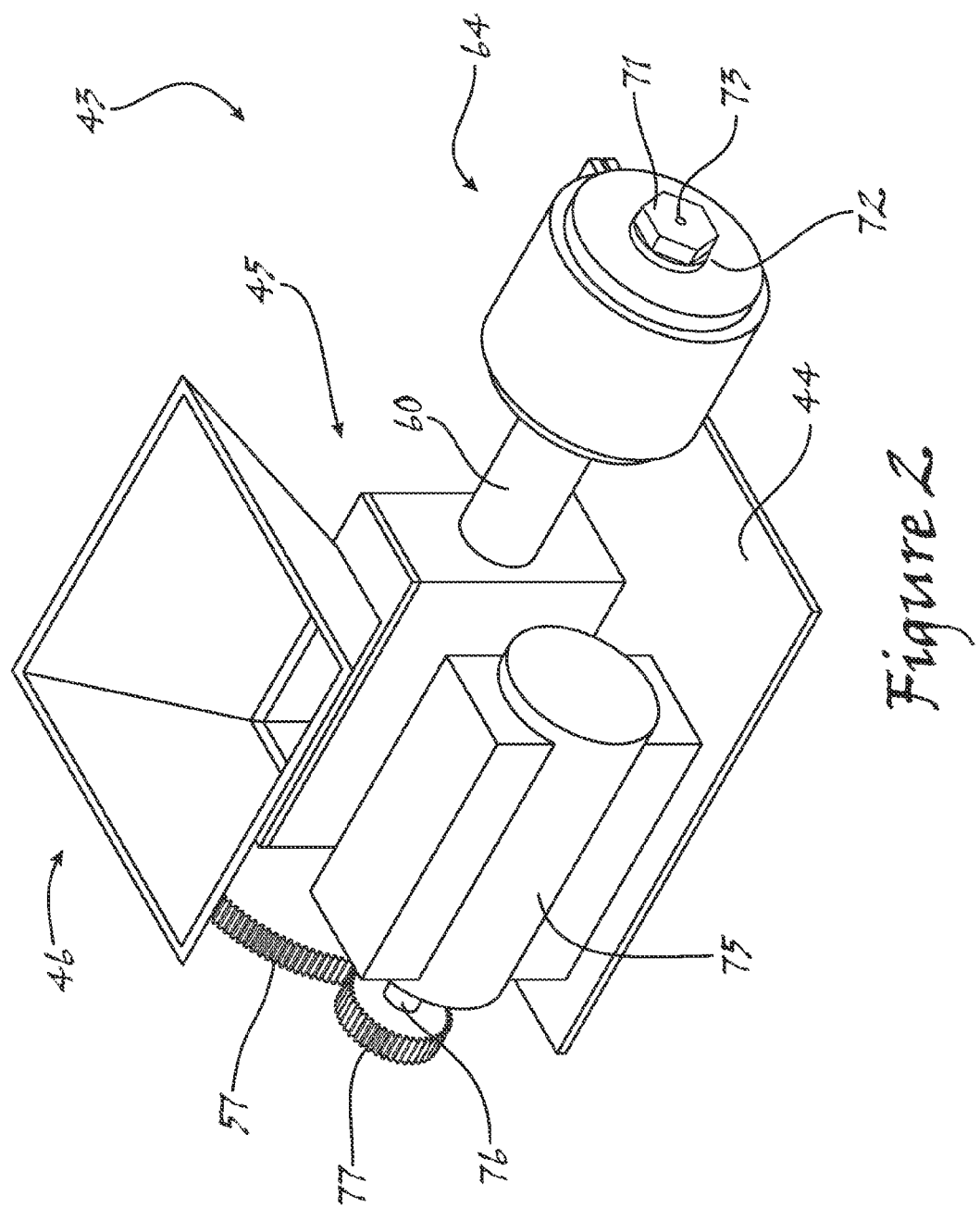
FIG. 2 shows, in a front isometric view, a plastic filament extruder as suitable for use of the control of system of FIG. 1.
Figure 3:
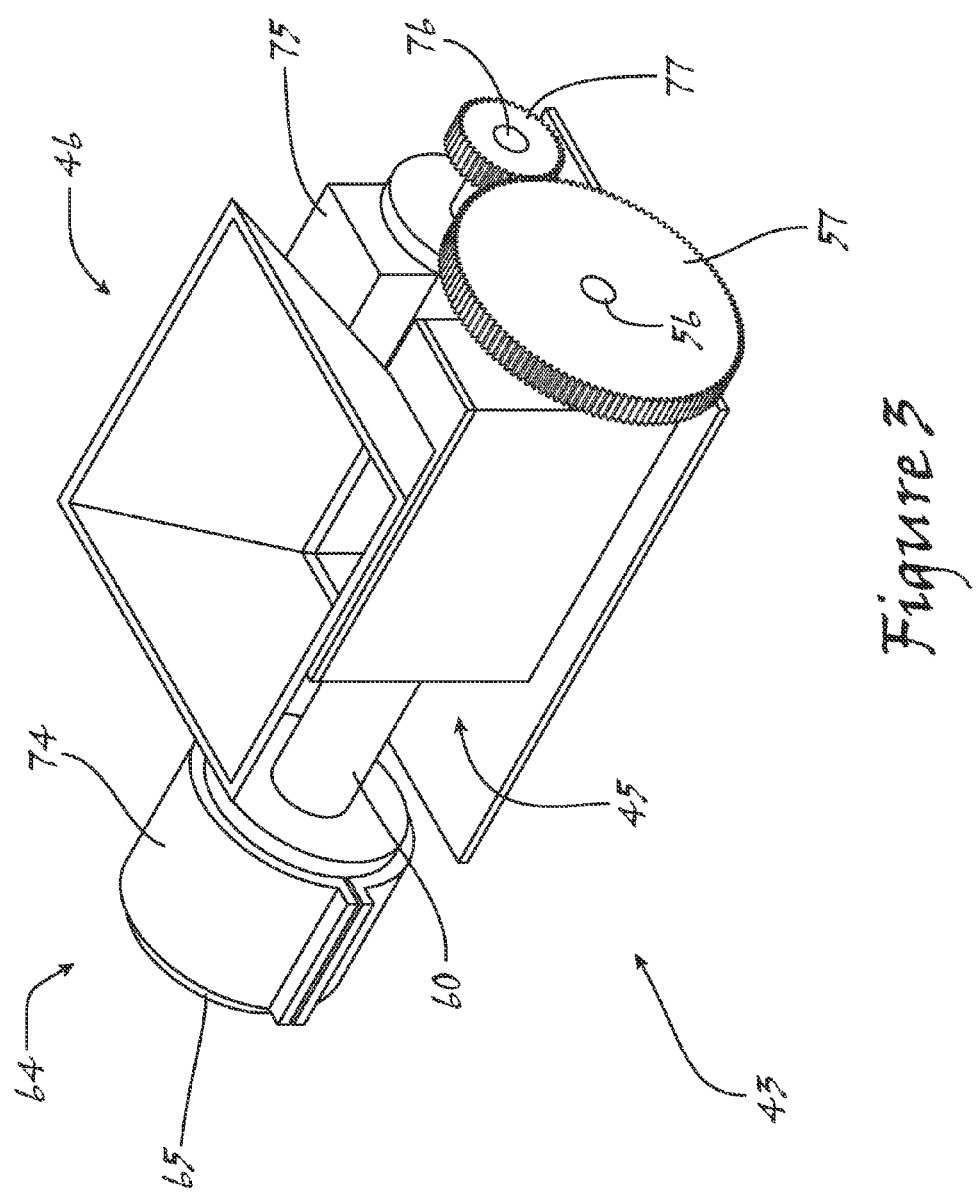
FIG. 3 shows, in a rear isometric view, the plastic filament extruder of FIG. 2.
Figure 4:
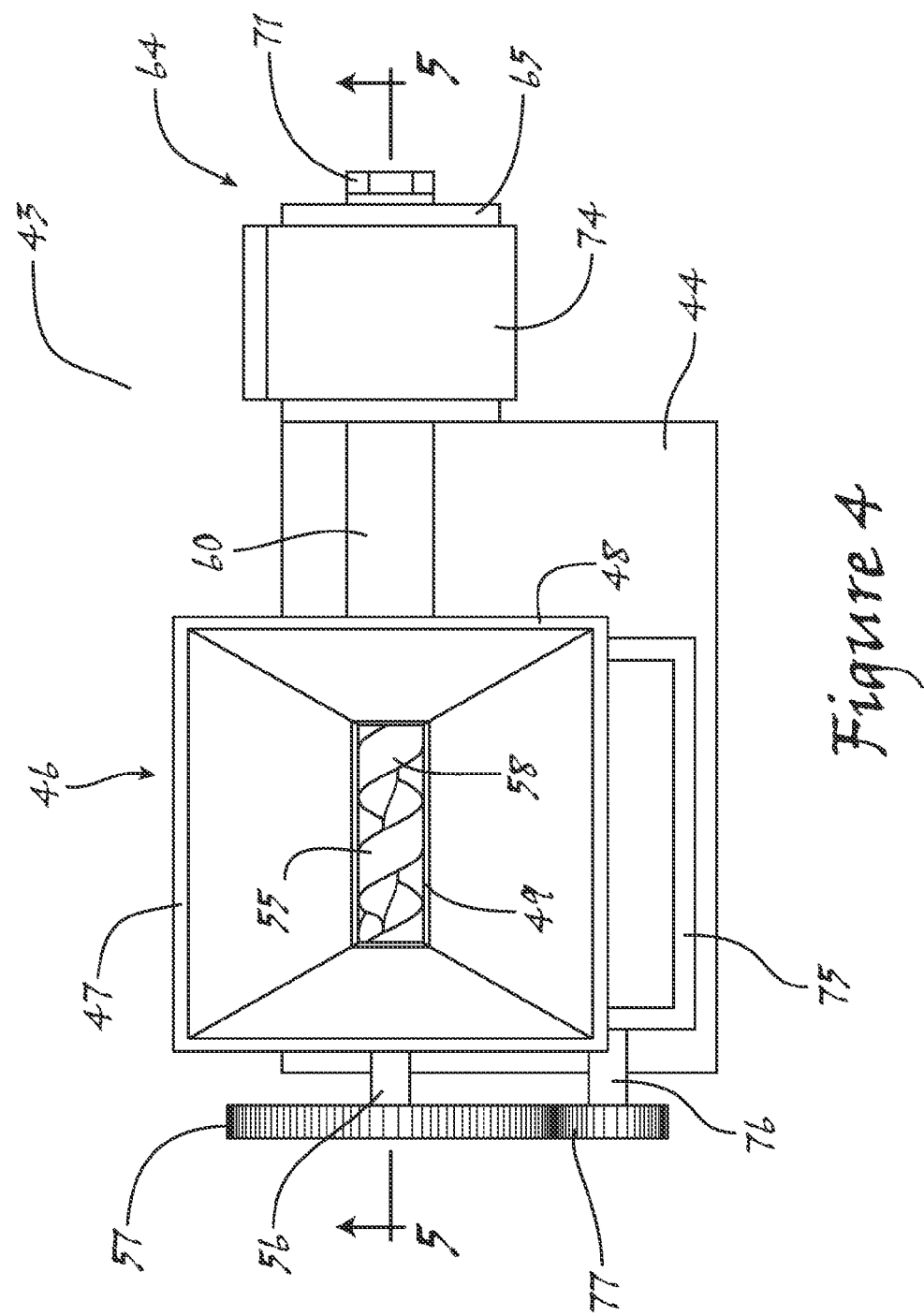
FIG. 4 shows, in a top plan view, the plastic filament extruder of FIG. 2.
Figure 5:
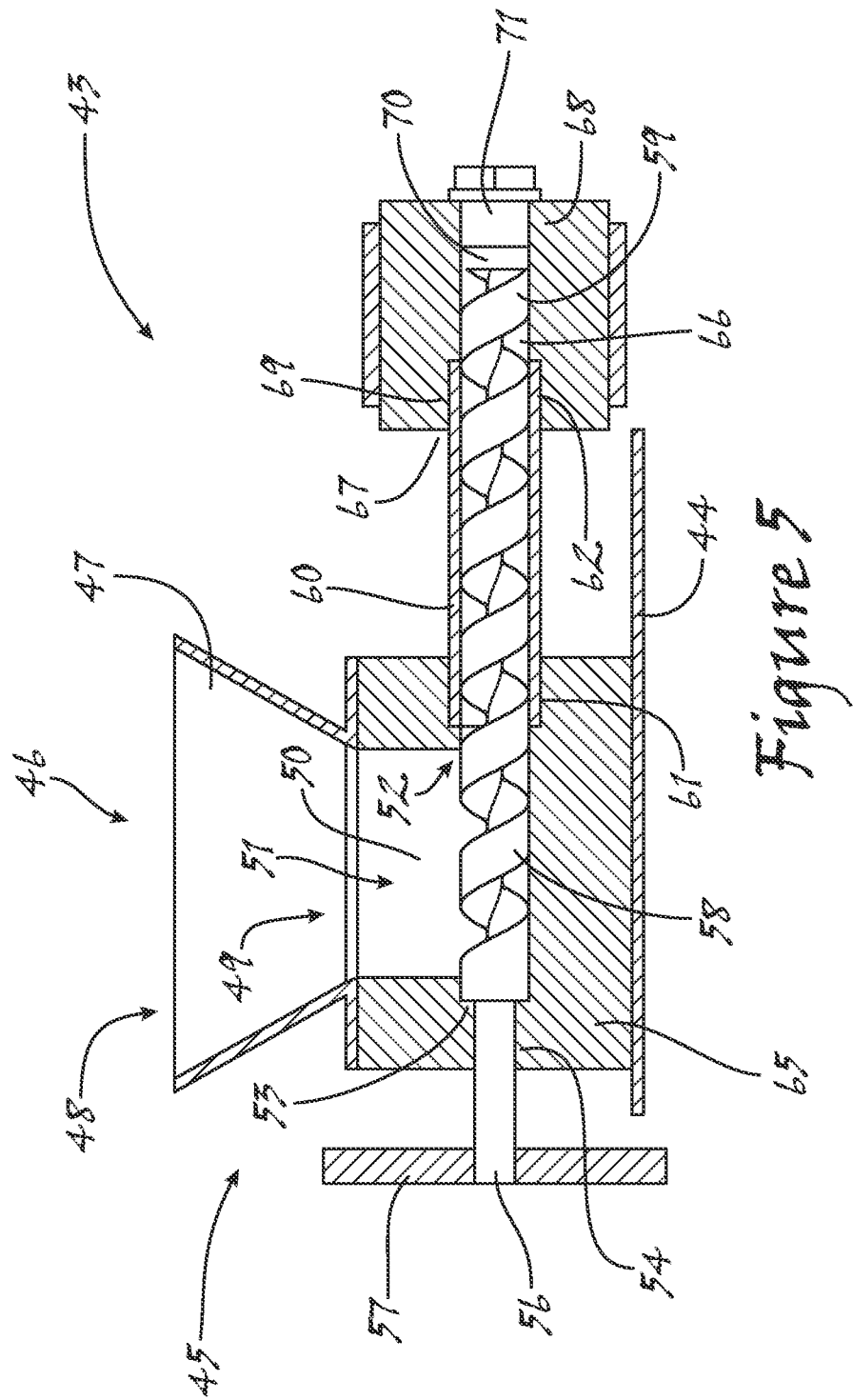
FIG. 5 shows, in a partially cut-away view taken through cut line 5-5 of FIG. 4, various details of the plastic filament extruder of FIG. 2, and wherein the auger and the die of the plastic filament extruder are not cut but rather shown in place in front elevational views.

Referring now to the figures, and to FIG. 1 in particular, the preferred implementation of the control system 20 of the present invention is shown to generally comprise a temperature control module 21 and an integrated or associated voltage and current meter 37 operatively adapted to control various aspects of an extruder 43 of the type typically utilized by hobbyists to produce plastic filament for use in home use additive manufacturing machines, commonly referred to as "3-D printers." Referring now to FIGS. 2 and 3, in particular, such an extruder 43 generally comprises a base 44 or frame upon which is mounted an auger body 45, a tubular conduit 60 extending from the auger body 45 and dependently supported a mold 64, and an electric drive motor 75 adapted to rotate an auger 55, which as particular depicted in FIGS. 4 through 6, is provided to run from the auger body 45, through the tubular conduit 60 and into an internal chamber 66 defined by the preferably aluminum main body 65 of the mold 64.

As shown in FIGS. 2 through 4, a drive shaft 76 from the electric motor 75 is operatively coupled to a drive shaft 56 of the auger 55 through provided drive gears 77, 57, respectively, or by any other substantially equivalent interconnection such as, for example, a sprocket and chain arrangement. In any case, as shown in FIGS. 4 and 5, the auger 55 is mounted generally within an internal chamber 50 of the auger body 45 with the screw 58 of the auger 55 extending through an outlet 52 from the internal chamber 50 leading to the conduit 60, which is secured at its first, proximal end 61 within or about the outlet 52 from the internal chamber 50. In order to fix the auger 55 operably in place, the auger body 45 is shown to comprise an axial through hole 54 or like bore though which the drive shaft 56 of the auger extends. Although, for clarity, not shown in the figures, those of ordinary skill in the art will readily recognize that other features should be and are implemented to promote smooth operation of the extruder 20 such as, for example, a thrust bearing fitted within a cylindrical shoulder 53 about the axial through hole 54 and drive shaft 56 adjacent to the internal chamber 50.

To feed a supply of plastic chips into the internal chamber 50 of the auger body 45, the auger body 45 also preferably comprises a hopper 46 having a chute 47 with open top 48 and terminating in an outlet 49 arranged atop and about an inlet 51 to the internal chamber 50, as particularly depicted in FIGS. 4 and 5. As shown in the figures, the auger 55 and internal chamber internal chamber 50 of the auger body 45 are most preferably cooperatively adapted such that the screw 58 of the auger 55 substantially occupies the space defined by the internal chamber 50.

Referring now to FIGS. 5 and 6, in particular, the second, distal end 62 of the tubular conduit 60 is shown to couple within or about an inlet 69 formed at a first end 67 of the main body 65 of the mold 64 and leading to the internal chamber 66 thereof. As also particularly shown in FIGS. 5 and 6, an extrudate shaping die 71, which may preferably take the form of a selectively replaceable plug 72, is affixed within an outlet 70 from the internal chamber 66 at a second end 68 of the main body 65 of the mold 64. As shown in FIGS. 2 and 5, the die 71 comprises an axial through hole 73, or aperture, therethrough which is sized as required to form the desired diameter plastic filament. In any case, as shown in FIG. 6, the auger is sized and positioned such that the distal end 59 of the screw 58 of the auger 55 (opposite the end of the auger 55 forming its drive shaft 56) terminates just short of the die 71. In this manner, the auger is adapted to force plastic through the through hole 73 of the die as the plastic chips, introduced through the hopper 46 and conveyed by the auger 55 through the conduit 60 and into the mold 64, are melted with the body 65 of the mold 64 by a band or like heater 74 operably provided about the body 65 of the mold 64.

In an inventive aspect of the present invention, Applicant has noted that when the temperature of the body 65 of the mold 64 is of insufficient temperature for adequate melting of plastic therein backpressure within the internal chamber 66 and about the screw 58 of the auger will immediately result in an increased draw of electric current by the drive motor 75. It is Applicant's inventive discovery that this effect can be utilized to implement an intrinsic feedback mechanism for operably controlling the target temperature of the body 65 of the mold 64 such that substantially uniform and suitable quality plastic filament may be readily had. With this in mind, FIG. 1 is again referred to as depicting additional details of the exemplary implemented control system 20 of the present invention.

As shown in FIG. 1, the implemented temperature control module 21 of the control system 20 comprises a temperature control circuit 29 (or equivalent logic) for monitoring and controlling the temperature of the body 65 of the mold 64. To this end, the temperature control circuit 29 comprises a temperature transducer 30 associated with and adapted to obtain the temperature of the body 65 of the mold 64 and a heater relay 31 adapted to switch power from a heater power source 32 in selective activation and deactivation of the band heater 74 about the body 65 of the mold 64, which activation and deactivation thus takes place under the control of the implemented temperature control module 21.

Likewise, an auxiliary control circuit 33 (or equivalent logic) is implemented as part of the temperature control module 21. As part of the auxiliary control circuit 33, a motor relay 34 is provided in connection with the drive motor 75 and adapted to switch power from a motor power source 35 in selective activation and deactivation of the drive motor 75, which activation and deactivation also takes place under the control of the implemented temperature control module 21. As will be better understood further herein, this feature of the present invention enables automatic deactivation of the motor 75 during periods where the measured temperature of the body 65 of the mold 64 is insufficient to allow a determined minimal flow of extrudate through the die 71.

Finally, the implemented temperature control module 21 is shown to also preferably comprise means for user input 22 and means for display 26 of temperature data. In particular, the user input 22 is shown to comprise a menu key 23 or like button for accessing programming functions of the temperature control module as may be necessary or desired and increment and decrement keys 24, 25, respectively, or like buttons for setting temperature values and/or other parameters accessed with the menu key 23. In particular, the user input 22 is adapted for setting a target temperature for the heating of the body 65 of the mold 64, which target temperature is preferably shown on the display 26 in a target value readout 27. Likewise, the display 26 also preferably comprises a measured value readout 28 for showing the actual temperature of the body 65 of the mold 64 as monitored through the implemented temperature transducer 30.

As also shown in FIG. 1, the combined voltage and current meter 37 of the control system 20 of the preferred implementation of the present invention comprises voltage and current transducer circuits 41, which are operably interconnected with the power source 35 for the electric drive motor 75. To this end, a current shunt 42 and other features are provided as necessary. In at least the most preferred implementations of the present invention, an amperage readout 39 is provided on an implemented display 38 for user monitoring of the electric current draw of the electric drive motor 75. Although not critical for operation of the present invention, voltage transducer circuits and an associated voltage readout 39 are readily, and therefore desirably, implemented. As will be appreciated by those of ordinary skill in the art, the availability of voltage information may be very helpful in troubleshooting malfunctions and/or ensuring, for example, that an implemented constant voltage power source is not tasked beyond capacity.

In any case, as will be better appreciated further herein, the control system 20 of the present invention is adapted to enable a user to set initial operating parameters for the extruder 43 as well as to monitor the operation of the extruder 43 and/or adjust parameters during operation. That said, an exemplary mode of operation for the heretofore described control system 20 of the present invention is now described in detail with reference to FIGS. 7 through 11.

Figure 7:
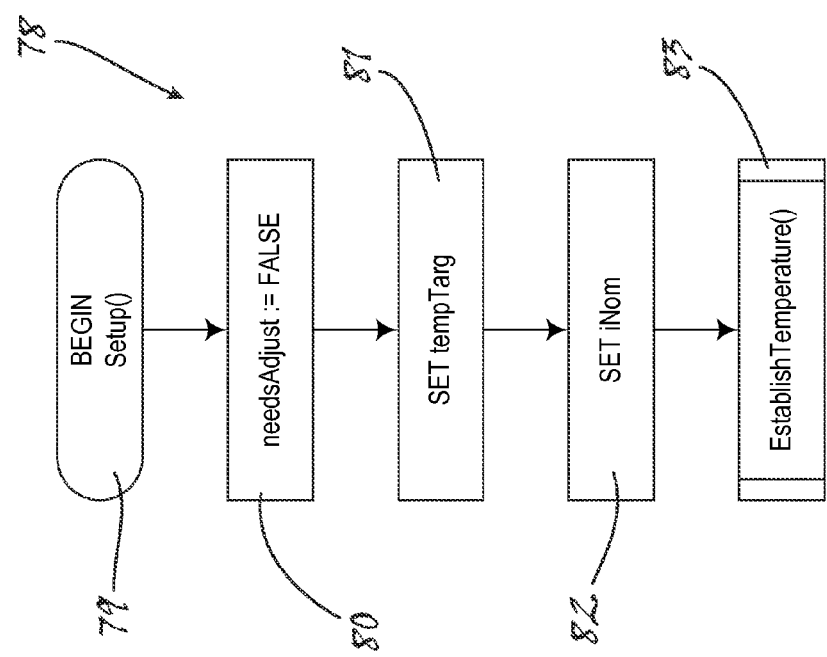

As shown in FIG. 7, the exemplary method of use of the control system 20 of the present invention generally begins with execution of a setup routine 78, during which initial operating parameters may be set by the user and variables may be initialized. For example, upon beginning the routine (step 79) as shown in the figure a needsAdjust variable, which, as will be better understood further herein is utilized to indicate that a low temperature condition exists at the body 65 of the mold 64, is initially set to FALSE (step 80) to indicate normal operating conditions. Likewise, the initial target temperature for the body 65 of the mold 64 may be set by the user (step 81) based upon the user's evaluation of the material to be extruded. In cases where the control system 20 is adapted to autonomously adjust the target temperature of the body 65 of the mold 64 based upon the measured current draw of the electric drive motor 75, the user may also set a expected nominal current draw (step 82), which like the initial target temperature may be determined based upon the user's evaluation of the material to be extruded. In any case, the setup routine terminates with the calling (step 83) of the establish temperature routine 89.

Figure 8:
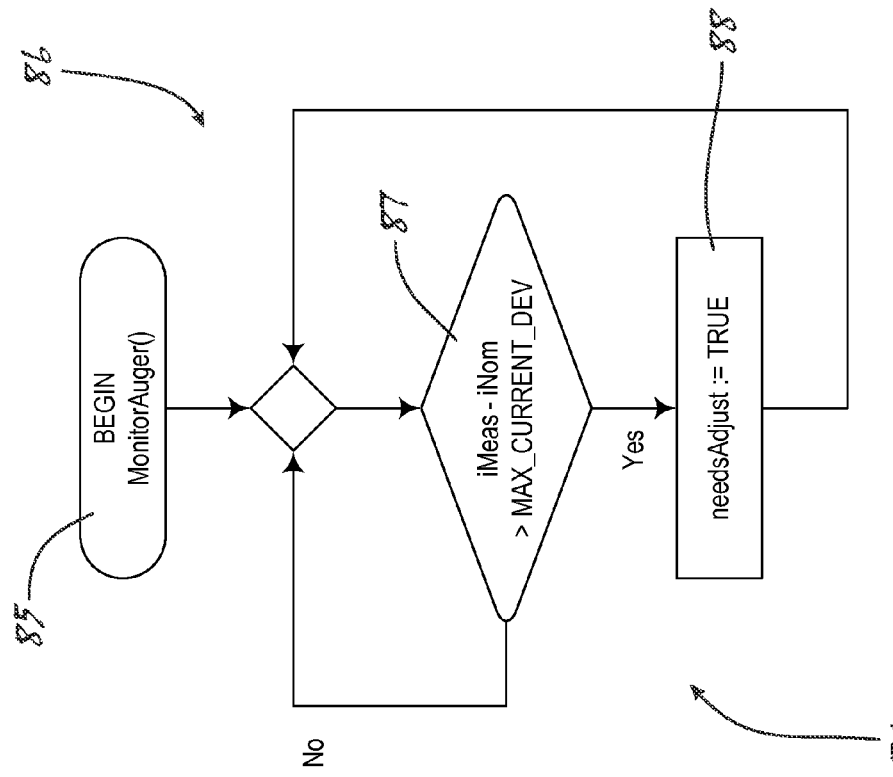

Simultaneously with the beginning (step 79) the setup routing 78, however, the exemplary control system 20 is programmed to also begin (85) a watchdog type monitor auger routine 85, which operates to continuously monitor the electric current drawn by the electric drive motor 75 to immediately identify a current increase indicative of a low temperature condition at the body 65 of the mold 64. As shown in FIG. 8, the monitor auger routine 85 operates in a repeat loop 86 where the measured current draw of the electric drive motor 75 is constantly evaluated to determine whether it exceeds a threshold value greater than the expected nominal value (step 87). If so, the needsAdjust variable is set to TRUE (step 88) for handling by the other routines as appropriate; if not, however, the repeat loop 86 simply continues.

Figure 9:
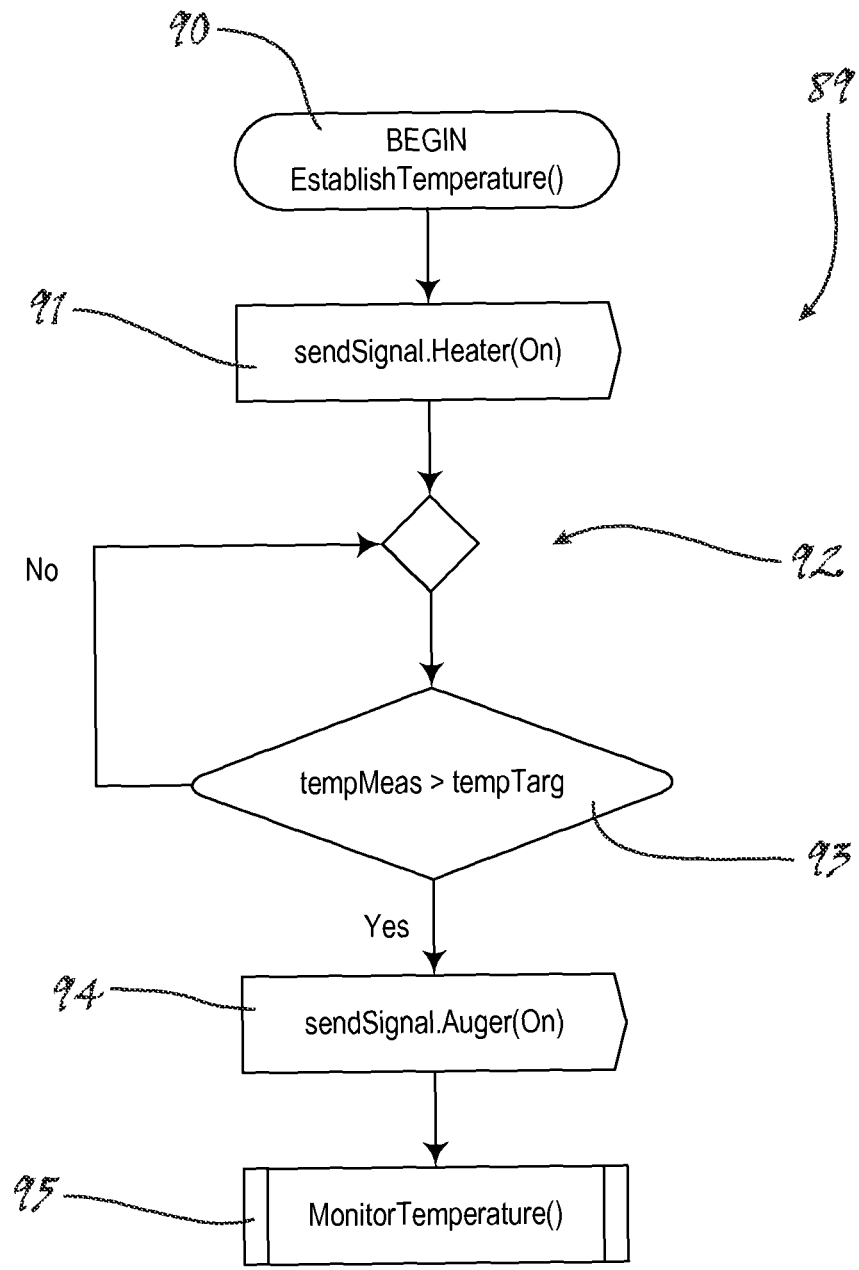

Turning then to the establish temperature routine 89 as depicted in FIG. 9, the routing is shown to begin 90 (step 90) by first sending a signal (step 91) to activate the heater relay 31. With the heater relay 31 activated, and the band heater 74 thus bringing the body 65 of the mold 64 up to the initial target temperature, the establish temperature routine 89 enters a repeat loop 92 to monitor this progress. Under operation of the routine 89, the measured temperature of the body 65 of the mold 64 is continuously evaluated against the target temperature (step 93). Once the measured temperature of the body 65 of the mold 64 is found to exceed the target temperature, however, the routine 89 breaks out of the repeat loop 92, sends a signal (step 94) to activate the motor relay 34, thereby turning on the electric drive motor 75, and terminates by calling (step 95) the monitor temperature routine 96.

Figure 10A:
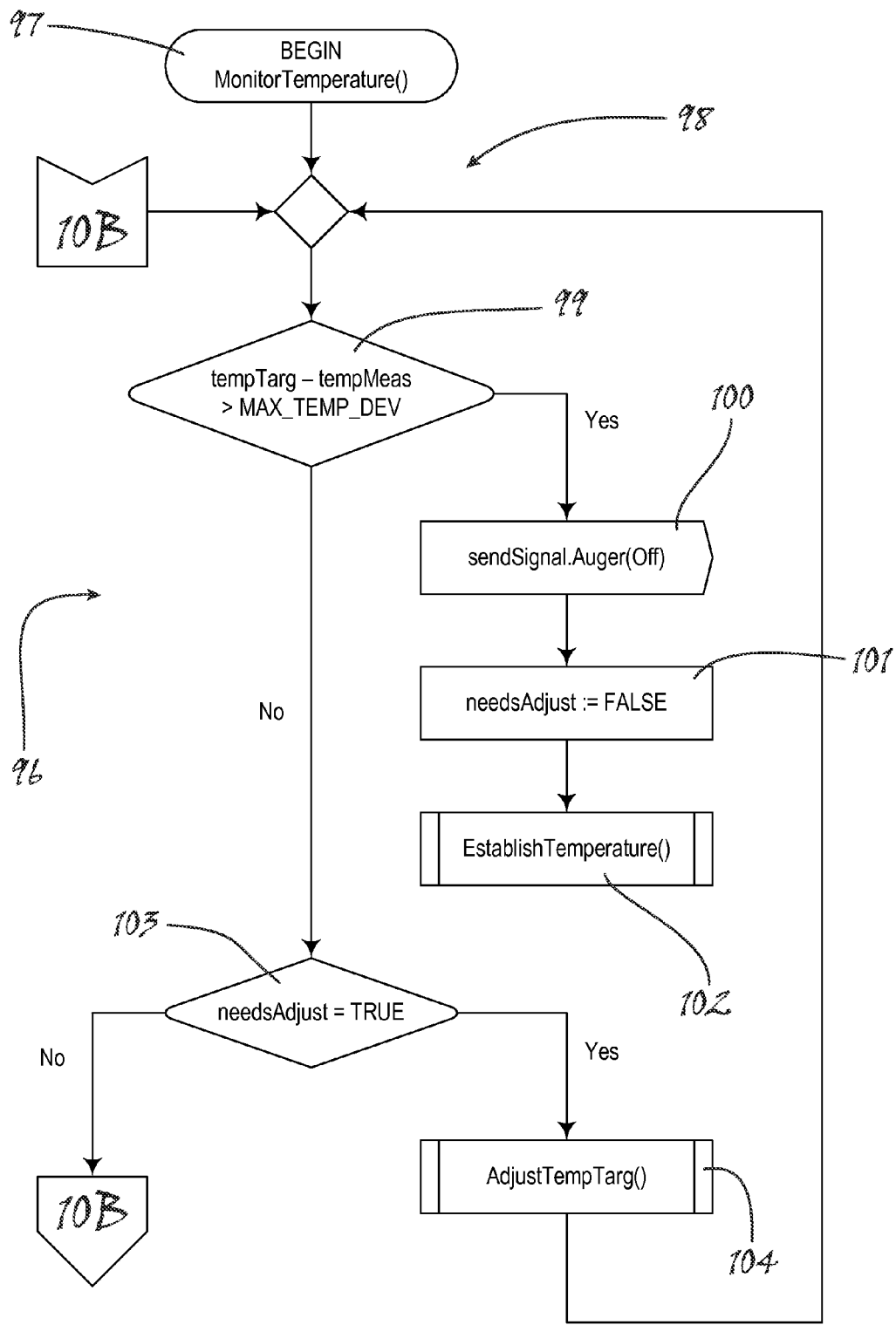
FIGS. 10A and 10B, which are to be taken together as a single figure and, collectively, are referred to herein as the single
Figure 10B:
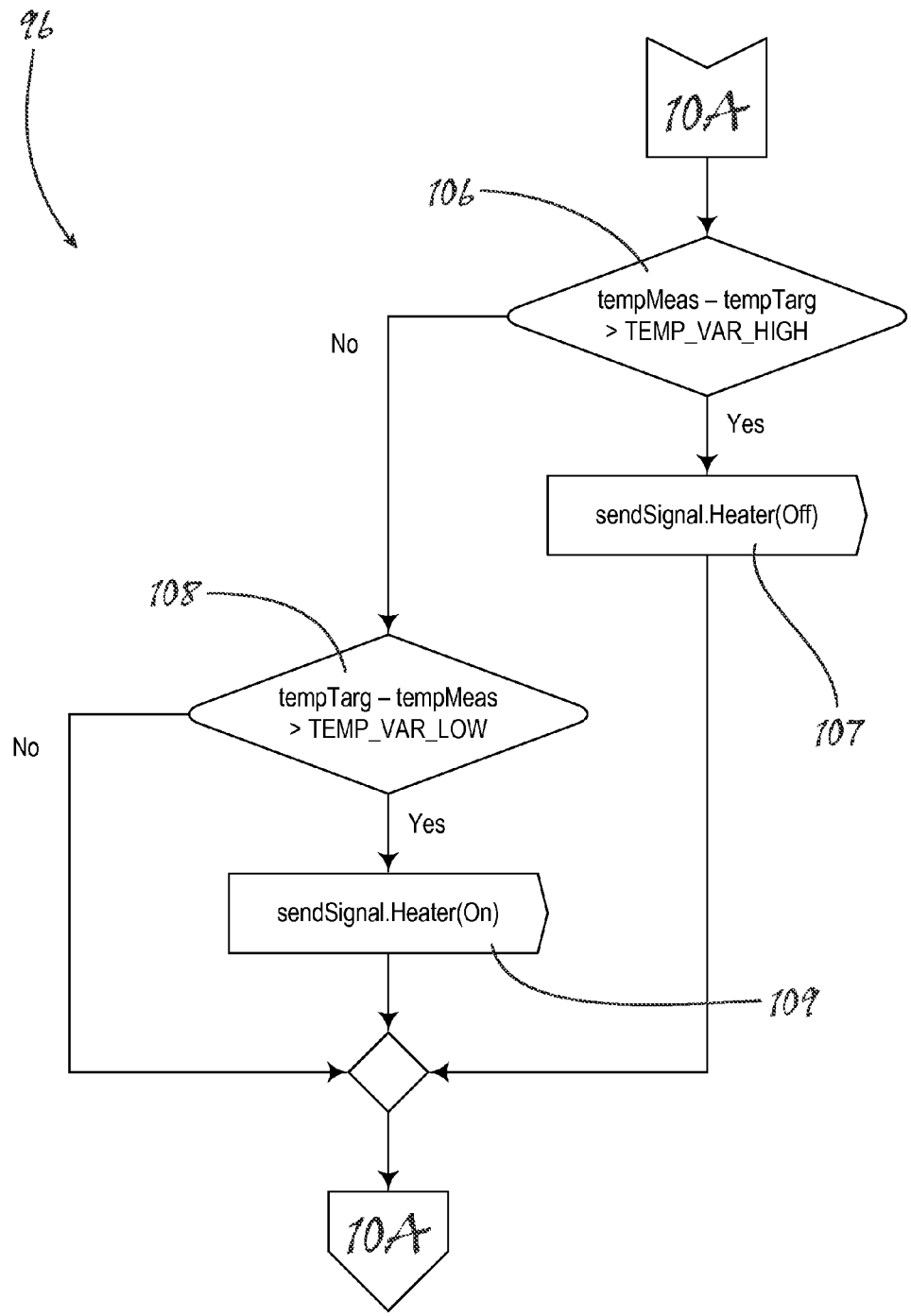
Figure 11:
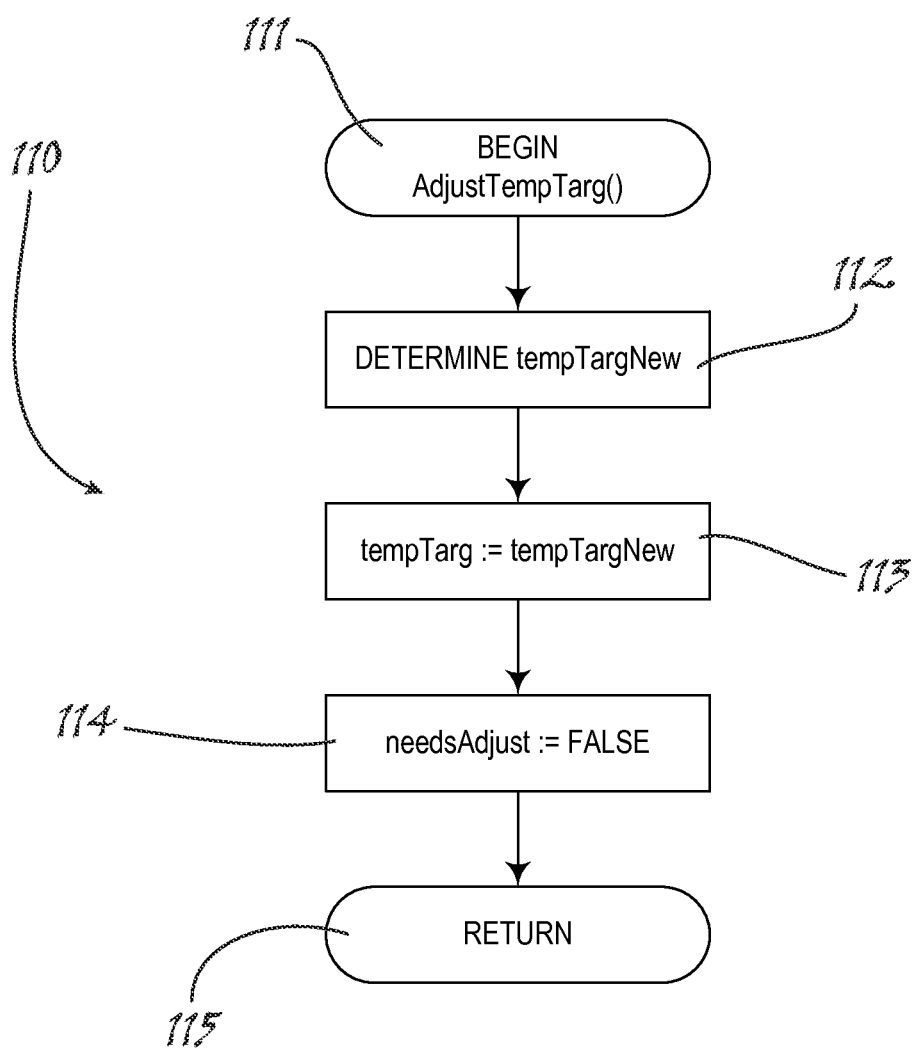

As shown in FIG. 10, the monitor temperature routine 96 begins (step 97) by entering a repeat loop 98 wherein the monitor temperature routine 96 (*a*) ensures that the auger 55 does not run under circumstances likely to jam its operation or damage the electric drive motor 75; (b) executes any adjustment of the target temperature indicated as necessary by the needsAdjust flag; and (c) attempts to maintain the actual (measured) temperature of the body 65 of the mold 64 within a range of temperatures established about the set target temperature.

In the first function of the monitor temperature routine 96—ensuring that the auger 55 does not run under circumstances likely to jam its operation or damage the electric drive motor 75—the monitor temperature routine 96 determines (step 99) whether the currently set target temperature of temperature of the body 65 of the mold 64 exceeds the actual (measured) temperature of the body 65 of the mold 64 by greater than a maximum threshold value. As will be appreciated by those of ordinary skill in the art in light of this exemplary description, this condition will generally only result following an upward adjustment of the target temperature for the body 65 of the mold 64, as will be described in greater detail further herein. If so, indicating that the body 65 of the mold 64 is likely at a temperature less than that required for readily producing extrudate, the monitor temperature routine 96 sends a signal (step 100) to deactivate the motor relay 34, thereby turning off the electric drive motor 75; sets the needsAdjust flag to FALSE (step 101), thereby ensuring that the flag is properly initialized to the expected condition upon a later restart of the electric drive motor 75; and terminates by calling (step 102) the establish temperature routine 89 to bring the body 65 of the mold 64 up to the target temperature.

If, on the other hand, it is determined (step 99) that the currently set target temperature of temperature of the body 65 of the mold 64 does not exceed the actual (measured) temperature of the body 65 of the mold 64 by greater than the maximum threshold value, the monitor temperature routine 96 proceeds to check the state (step 103) of the needsAdjust flag. If the flag is determined (step 103) to be TRUE, indicating that the monitor auger routine 85 has found that the measured current draw of the electric drive motor 75 has exceeded the expected nominal value by an amount greater than the maximum allowable threshold, the monitor temperature routine 96 calls (step 104) the adjust target temperature subroutine 110 to remedy the condition.

The adjust target temperature subroutine 110 begins (step 111) by first determining (step 112) an appropriate new target temperature for the body 65 of the mold 64. While the new temperature may be a fixed or percentage value greater than the currently set target temperature; a value determined based on a formula whereby, for example, a more extreme, rapid or like deviation in current results in a greater increase in target temperature; or any equivalent calculation, it is noted that in autonomous implementations of this feature it is desired that the new temperature be a temperature sufficiently greater than the previously set target temperature as to cause the auger 55 to be deactivated (see step 99). In any case, the target temperature is then set (step 113) to the newly determined target temperature, which is automatically done by the temperature control module 21 in autonomous implementations or, in the case of manual intervention, by user action through the increment key 24 of the provided user input 22. The needsAdjust flag is then reset (step 114) to FALSE, accounting for a situation in which the new temperature is not a temperature sufficiently greater than the previously set target temperature as to cause the auger 55 to be deactivated, and the adjust target temperature subroutine 110 returns (step 115) in place to the monitor temperature routine 96 where the repeat loop 98 continues.

If, on the other hand, the needsAdjust flag is determined (step 103) to be FALSE, indicating that the measured current draw of the electric drive motor 75 appropriate near the expected nominal current, the monitor temperature routine 96 continues with steps to maintain the actual (measured) temperature of the body 65 of the mold 64 within a range of temperatures established about the set target temperature. At this juncture, it should be noted that any number of techniques or algorithms may be implemented in fulfillment of this requirement. For example, at one end of the spectrum, the upper and lower threshold values discussed below may simply be set at absolute value of percentage deviations from the target temperature value or, at the other end of the spectrum, advanced algorithms such as implemented in the well-known proportional-integer-derivative ("PID") type controllers may be utilized. In any case, the following exemplary only discussion is intended to describe the integration of this feature with the extruder 43 according to the preferred methods of the present invention.

With the foregoing in mind, and recognizing that the following steps may to some extend be reordered, the exemplary implementation of the monitor temperature routine 96 continues by determining (step 106) whether the actual (measured) temperature of the body 65 of the mold 64 exceeds and upper threshold value above the currently set target temperature of temperature of the body 65 of the mold 64. If so, the monitor temperature routine 96 sends a signal (step 107) to deactivate the heater relay 31, thereby turning off the band heater 74 about the body 65 of the mold 64, and the monitor temperature routine 96 continues with the repeat loop 98. On the other hand, if the monitor temperature routine 96 determines (step 106) that the actual (measured) temperature of the body 65 of the mold 64 does not exceed the upper threshold value above the currently set target temperature of temperature of the body 65 of the mold 64, the monitor temperature routine 96 proceeds to determine (step 108) whether the currently set target temperature of temperature of the body 65 of the mold 64 exceeds a lower threshold above the actual (measured) temperature of the body 65 of the mold 64. If so, the monitor temperature routine 96 sends a signal (step 109) to activate the heater relay 31, thereby turning on the band heater 74 about the body 65 of the mold 64, and the monitor temperature routine 96 simply continues with the repeat loop 98. If not, the monitor temperature routine 96 continues with the repeat loop 98.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that the temperature control module 21 of the control system 20 of the present invention preferably comprises an isolated power source 36 separate from the other implemented power sources, thereby ensuring that inductance or the like from the motor 75 do not interfere with the operation of the implemented circuitry. In any case, because the scope of the present invention is much broader than any particular embodiment, the foregoing detailed description should not be construed as a limitation of the scope of the present invention, which is limited only by the claims appended hereto.

What is claimed is:

1. A method for control of a plastic filament extruder, said method for control comprising the steps of:
   providing a plastic filament extruder, said plastic filament extruder comprising:
   an auger body having an internal chamber for collecting a quantity of plastic chips and a hopper adapted to feed collected plastic chips into said internal chamber of said auger body;
   a mold having a body defining an internal chamber; a heater adapted to heat said body, and said internal chamber of said body, of said mold; and an extrudate shaping die positioned in an outlet from said internal chamber of said body of said mold;

a conduit extending from an outlet from said internal chamber of said auger body to an inlet to said internal chamber of said body of said mold;

an auger extending from said internal chamber of said auger body, through said conduit and into said internal chamber of said body of said mold; and an electric motor operatively adapted to drive rotation of said auger;

introducing a quantity of plastic chips into said internal chamber of said auger body;

activating said heater to heat said body of said mold to a target temperature;

activating said electric motor in response to said body of said mold reaching said target temperature, thereby causing said auger to drive said plastic chips from said internal chamber of said auger body into said internal chamber of said body of said mold and, as said plastic chips are melted within said internal chamber of said body of said mold, through said die;

monitoring the electric current draw of said electric motor; and upwardly adjusting said target temperature of said body of said mold in response to a threshold increase in the electric current draw of said electric motor.

2. The method for control of a plastic filament extruder as recited in claim 1, said method for control further comprising the step of maintaining said body of said mold within a temperature range about said target temperature.

3. The method for control of a plastic filament extruder as recited in claim 1, said method for control further comprising the step of deactivating said electric motor in response to said target temperature exceeding a threshold deviation above the temperature of said body of said mold.

4. The method for control of a plastic filament extruder as recited in claim 3, said method for control further comprising the step of maintaining said body of said mold within a temperature range about said target temperature.

5. The method for control of a plastic filament extruder as recited in claim 1, wherein said upwardly adjusting said target temperature step is autonomously conducted.

6. The method for control of a plastic filament extruder as recited in claim 5, said method for control further comprising the step of maintaining said body of said mold within a temperature range about said target temperature.

7. The method for control of a plastic filament extruder as recited in claim 5, said method for control further comprising the step of deactivating said electric motor in response to said target temperature exceeding a threshold deviation above the temperature of said body of said mold.

8. The method for control of a plastic filament extruder as recited in claim 7, said method for control further comprising the step of maintaining said body of said mold within a temperature range about said target temperature.

* * * * *